US012796725B2

(12) United States Patent
Portner et al.

(10) Patent No.: US 12,796,725 B2
(45) Date of Patent: Nov. 17, 2026

(54) PRESS RAM WITH NON-STICK STRUCTURE

(71) Applicant: Rychiger AG, Steffisburg (CH)

(72) Inventors: Michael Portner, Oberhofen A.t (CH); René Dellsperger, Steffisburg (CH); Andreas Spring, Heimberg (CH)

(73) Assignee: Rychiger AG, Steffisburg (CH)

( * ) Notice: Subject to any disclaimer, the term of this patent is extended or adjusted under 35 U.S.C. 154(b) by 133 days.

(21) Appl. No.: 18/913,301

(22) Filed: Oct. 11, 2024

(65) Prior Publication Data

US 2025/0120426 A1 Apr. 17, 2025

(30) Foreign Application Priority Data

Oct. 12, 2023 (EP) .................................... 23203299

(51) Int. Cl.

*A23P 30/10* (2016.01)
*A23F 5/12* (2006.01)
*B23K 26/352* (2014.01)
*B23K 103/04* (2006.01)

(52) U.S. Cl.

CPC .............. *A23P 30/10* (2016.08); *A23F 5/125* (2013.01); *B23K 26/3584* (2018.08); *B23K 2103/04* (2018.08)

(58) Field of Classification Search

CPC ..... A23P 30/10; A23F 5/125; B23K 26/3584; B23K 2103/04; B30B 15/065; B30B 11/00; B30B 15/022

See application file for complete search history.

(56) References Cited

U.S. PATENT DOCUMENTS

2002/0018730 A1* 2/2002 Okuyama ........... H01F 41/0273 419/66
2010/0294015 A1* 11/2010 Fahrenbach ............ B44B 5/009 72/414
2010/0330385 A1* 12/2010 Sawaguchi .............. C21D 7/06 425/352
2018/0290415 A1* 10/2018 Tsuruta ................. B30B 15/022
2019/0248068 A1* 8/2019 Kesper .................... B30B 3/005

* cited by examiner

*Primary Examiner* — Michael M. Robinson
(74) *Attorney, Agent, or Firm* — Lerner David LLP

(57) ABSTRACT

A molding tool for use in pressing operations for pressing powder material, in particular coffee powder, includes a concave, in particular dome-shaped, pressing surface. On the pressing surface there is an extensive non-stick texture for preventing powder material, in particular coffee powder, from adhering. The non-stick texture includes a multiplicity of local recess structures, wherein the recess structures each have a depth of 0.04 mm to 0.2 mm, in particular a depth of 0.08 mm to 0.14 mm. The non-stick texture prevents powder material from adhering during and after a pressing operation, even in the case of powder materials containing oil, e.g. coffee powder. It also prevents such adhering for different types of coffee and in pressing operations in which high pressures arise.

17 Claims, 3 Drawing Sheets

PRESS RAM WITH NON-STICK STRUCTURE

CROSS-REFERENCE TO RELATED APPLICATIONS

The present application claims the benefit of European Application No. 23203299.5, filed Oct. 12, 2023, the disclosure of which is incorporated herein by reference.

TECHNICAL FIELD

The invention relates to a molding tool for use in pressing operations for pressing powder material, in particular coffee powder, comprising a concave, in particular dome-shaped, pressing surface.

BACKGROUND ART

Molding tools, such as press rams, can be used to press powder materials, in particular coffee powder. In this process, one or more molding tools exert a strong pressing force on the powder material via extensive pressing surfaces. Such molding tools are used in particular for applications in which the powder material is pressed into a solid molded body. Examples of applications for this type of molding tool include the production of pharmaceutical tablets, washing machine tabs, animal feed or even coffee capsules, which are at least partly made of pressed coffee. In particular, a fixed amount of powder material is provided, which is then pressurized by one or more molding tools in such a way that a solid molded body is formed. This type of molding tool and its use is well known.

The disadvantage of the known solutions is that, in particular with powder materials containing oil, such as coffee powder, residues of the powder material can adhere to the pressing surface of the molding tool during and after the pressing operation This means that powder material remains on the pressing surface after the pressing surface no longer exerts any pressure on the powder material. The adhering powder material then does not become part of the molded body, as actually intended, and remains on the pressing surface after removal of the pressing surface. As a result, the volume and weight of the molded body produced may differ from the expected values In addition, the adhering powder material can also affect a further subsequent pressing operation, thus causing further unwanted deviations in the molded bodies produced. The powder material can also accumulate, further exacerbating the problems.

SUMMARY OF THE INVENTION

The task of the invention is to provide a molding tool that belongs to the technical field mentioned at the beginning and effectively prevents powder material from adhering during and after a pressing operation.

According to the invention, an extensive non-stick texture is located on the pressing surface to prevent the powder material from adhering, wherein the non-stick texture comprises a multiplicity of local recess structures and wherein the recess structures each have a depth of 0.04 mm to 0.2 mm, in particular a depth of 0.08 mm to 0.14 mm.

A powder material refers to all materials that are essentially present as loose grains, i.e. as a powder. In particular, this refers to materials that consist largely, in particular more than 80%, of grains whose maximum diameter is less than 5 mm, in particular less than 3 mm. In particular, a powder material refers to coffee powder made from ground coffee beans.

A molding tool is a component that can be used in pressing operations. For this purpose, it includes a pressing surface (see below). In the case of molding tools that are moved, for example by means of a hydraulic system, in particular tappets, the molding tool may include a shaft, in particular a cylindrical shaft, behind the pressing surface. The pressing surface and the shaft may consist of a single body or several connected bodies. Stationary molding tools, which, for example, merely resist the force of another tappet, may also have, in particular, a holder instead of the shaft, or in addition to the shaft, with which they can be appropriately attached and fixed.

A pressing surface is a contiguous surface of the molding tool whose size and shape are essentially (with possible deviations) based on a part of the surface of a respective molded body to be produced. The inventive pressing surface is concave with respect to the molding tool. In particular, the pressing surface is dome-shaped. By dome-shaped, it is meant that the pressing surface has a circular outer edge, in particular with a diameter of 10 mm to 40 mm, and inside the edge there is a concave surface that is symmetrical to the surface normal of the center of the surface. The surface thus has a shape that approximately corresponds to the shape of a spherical segment and is curved. In contrast to a spherical segment, the dome-shaped pressing surface can, for example, have several different radii of curvature in its curvature. In particular, the pressing surface has radii of curvature of 10 mm to 15 mm. Due to these different curvatures, the pressing surface can, for example, take into account or compensate for a subsequent expansion of a pressed body after the pressing operation.

The pressing surface is at least impermeable to the respective powder material. In particular, the texture of the pressing surface (apart from the non-stick texture) is smooth. This means that it has no structures on the scale of the grains of the powder material or the fine structure of the non-stick texture, but is instead continuous and even. Possible larger structures, for example, can be raised or recessed areas in the form of lettering or designs that can this way be pressed into a molded body.

The following terms are used to define the geometry of the non-stick texture: a depth or a height denotes a relative distance or position along a surface normal of the pressing surface at the respective location of the pressing surface. An increasing depth denotes a position or distance that increases along the normal towards the molding tool, while an increasing height denotes a distance or position that increases away from the molding tool.

A local recess structure has a recess, i.e. starting from at least one point, the deepest point within the recess or recesses, the height of the pressing surface within the local area of the recess structure increases in all directions. The depth of the recessed structure corresponds to the mean height distance up to which the height of the surface of the pressing surface increases continuously from the lowest point of the recess.

The distance between two recessed structures is, in particular, the shortest path (and its length) along the pressing surface that leads from a point on the pressing surface within the first recessed structure and at half the depth of the first recessed structure to a point on the pressing surface within the second recessed structure and at half the depth of the second recessed structure. If there are several such shortest paths, all these paths represent a distance between the two recessed structures.

The inventive non-stick texture is an extensive texture of the pressing surface. The non-stick texture is an area of the pressing surface with a structuring of the surface of the pressing surface, wherein this area comprises a multiplicity of local recess structures, the recess structures each having a depth of 0.04 mm to 0.2 mm, in particular a depth of 0.08 mm to 0.14 mm.

A multiplicity of recess structures denotes a quantity of more than three recess structures, in particular more than 1000, preferably more than 5000 recess structures. In particular, it is less than 1,000,000,000, preferably less than 1,000,000, recess structures.

The area of the non-stick structure refers in particular to the largest area on the pressing surface that can be bounded by interconnected boundaries, each of which runs within a recessed structure (below half its depth) or each of which corresponds to a distance between two recessed structures of the multiplicity (as defined above).

It has been surprisingly demonstrated by experiments that the inventive non-stick texture is able to prevent powder material from adhering to the pressing surface of the molding tool, particularly in the rear area of the molding tool (near the center of the pressing surface), even at comparatively high contact pressures (in particular at contact pressures of 4500 N to 7500 N), particularly effectively. This is surprising in that the aim is usually to achieve a surface that is as smooth and featureless as possible in order to prevent material from sticking. In particular, the non-stick texture prevents coffee powder, which tends to stick during pressing operations due to the oily substances it contains, from sticking. Furthermore, the inventive non-stick texture also effectively prevents the sticking of coffee powders of different types, e.g. different degrees of grinding, bean types or degrees of roasting, making the inventive molding tool particularly universally applicable. Possible reasons for the effect of the innovative non-stick texture are the formation of air pockets in the recesses, which reduces contact with the powder material, or a reduction in the contact area by structuring the pressing surface to a comparable or smaller size than the powder material.

In a preferred embodiment of the invention, the local recess structures are laser engraved. This means that the recess structures have been created by a laser engraving process. In such a process, a change in the surface texture is produced locally by laser irradiation on a surface to be engraved, e.g. a molding tool blank, in particular by laser ablation. By introducing heat into a very localized area of the material under the surface to be engraved, the material is heated and then vaporized, or even converted into a plasma. It can also lead to resublimation and condensation of parts of the vaporized material on the surface to be engraved. Laser ablation produces recess structures characteristic for laser engraving. Experiments have shown that a non-stick texture with laser engraved recess structures is particularly suitable for preventing powder material from adhering and is easy to produce. In addition, molding tools with laser engraved recess structures can be particularly wear-resistant, since durable materials (see below) can be selected as the surface material of the pressing surface.

Alternatively, non laser engraved non-stick textures are conceivable, which are, for example, pressed in or produced by thin-film processes (e.g. by physical vapor deposition).

Preferably, the laser engraved recess structures are engraved with a laser incidence angle of at most 40°, in particular at most 20°.

The laser incidence angle refers to the angle of incidence of the laser beam on the surface to be engraved, in particular the angle of the laser to the plumb line of the surface to be engraved. If the laser incidence angle is too high and the laser is incident at an angle to the surface to be engraved, this creates recesses that are inclined in relation to the pressing surface and have an asymmetrical surface profile. A recess structure that is laser engraved at an angle of 40° or less, and in particular at an angle of 20° or less, has a characteristic structure. It is particularly rotationally symmetrical with respect to a local surface normal of the pressing surface. In addition, it deepens along the local surface normal of the pressing surface. These types of recess structures have been shown in experiments to be particularly suitable for preventing the adhesion of powder material.

Alternatively, the recess structures can be non laser engraved or engraved with a different laser incidence angle.

In a preferred embodiment of the molding tool, the recess structures are each laser engraved through a plurality of individual ablations, wherein an individual ablation in each case produces a local recess having a depth of 0.0002 mm to 0.0006 mm.

An individual ablation creates a local recess on the surface to be engraved using a single laser pulse. A recess structure according to the invention is then created by superimposing such individual ablations. This is usually accomplished by an engraving laser emitting several laser pulses at time intervals onto the same point on the surface to be engraved. For example, the engraving laser can scan the surface of the resulting non-stick texture several times, with only a single ablation taking place per recess structure. The depth of the local recess resulting from a single ablation is, as mentioned above, the mean height distance by which the height of the surface of the pressing surface increases continuously from the lowest point of the recess.

The recess structure is characterized by a characteristic recess profile due to the fact that it is created from several individual ablations, in which material evaporation and also material deposition from the vapor (by condensation and/or resublimation) take place. For example, the laser engraved recess structure can assume a defined depth relatively independently of its extensive expansion, since the individual ablations are limited in their intensity.

Tests have shown that recess structures laser engraved by multiple individual ablations with a respective depth of 0.0002 mm to 0.0006 mm are particularly suitable for preventing the adhesion of powder material. Furthermore, inventive recess structures laser engraved in this way can be produced in a commercially available way—and thus simply.

Alternatively, the recess structures can also be laser engraved without individual ablation, or with individual ablations that create a different depth. The recess structures can also be laser engraved, for example, with a single total ablation that creates the depth of the recess structure with just one laser pulse.

In a preferred variant of the above-mentioned embodiment of the invention, the recess structures are each laser engraved through at least 10 and at most 50 individual ablations, in particular at least 20 and at most 40 individual ablations. One possible type of laser engraving is to carry out the individual ablations in layers. In the case of a layer, for a sub-area or the entire area of the surface to be engraved, for each layer, at each point where a recess structure is to be located one individual ablation is then carried out. The laser engraving of the surface then takes place in several such layers.

It has been shown that recess structures laser engraved in this way form a non-stick texture that effectively prevents powder material from adhering. This means that the inventive molding tool can be produced reliably and reproducibly using conventional methods.

Alternatively, the recess structures can also be laser engraved with fewer or more individual ablations. However, this could have a negative effect on the shape of the recess structures, for example, they could be comparatively wide (in relation to the pressing surface) or have a less homogeneous shape, and thus be less efficient overall at preventing powder material from adhering. As a further alternative, a non-stick texture can also be created without laser engraved recesses.

In a preferred embodiment of the invention, the recess structures are laser engraved by a laser with a focus diameter of 0.005 mm to 0.2 mm, in particular 0.02 mm to 0.1 mm.

This means that during laser engraving, the laser light or laser beam with a focus diameter of 0.005 mm to 0.2 mm, in particular 0.02 mm to 0.1 mm, shines on the surface to be engraved. The focusing lens usually has a surface distance that focuses the laser light onto the surface to be engraved. The focus diameter is usually the diameter of a circle with 86.5% power content of the laser light in the focus, or, in the case of an approximately Gaussian beam profile, twice the beam radius at the beam waist.

The focus diameter has a strong influence on the shape of the local recesses created, in particular on their horizontal extent. In experiments, the recess structures laser engraved with such a focus diameter have shown particularly good properties for effectively preventing the adhesion of powder material. Furthermore, these laser parameters are easy to generate, making the inventive molding tool easy to produce.

In a preferred embodiment of the invention, the recess structures are laser engraved by a laser with a focus depth of 0.05 mm to 5 mm, in particular 0.2 mm to 3 mm. The focus depth here refers in particular to the double distance from which the laser beam, starting from the focus, increases its diameter (analogous to the above definition) by the factor $\sqrt{2}$. In particular, the focus depth corresponds to double the Rayleigh length. Recess structures laser engraved with such a (relatively large) focus depth have a characteristic ratio of depth to extensive expansion and thus a shape that is particularly well suited to preventing the adhesion of powder material. Another advantage of the laser engraved recess structures is that small differences in height on the surface to be engraved have less influence on the recess structures. The reason for this is the small change in the focus diameter within the focus length. This is also referred to as the tolerance of the focus depth.

In a preferred embodiment of all the above variants with laser engraved recess structures, the recess structures are laser engraved by an ytterbium fiber laser. An ytterbium fiber laser comprises a glass fiber doped with ytterbium as the active medium. The beam quality typical for glass fiber lasers (e.g. $M^2<1.2$, wherein $M^2$ indicates the diffraction index) produces characteristic recessed structures. In particular, such beam quality results in local recesses whose horizontal extent corresponds more closely to the focus diameter of the laser. This is due to the comparatively low laser divergence (e.g. compared to an Nd:YAG laser) in the focus area. Thus, recess structures laser engraved with a ytterbium fiber laser have a comparatively small horizontal extent in relation to their depth, compared to laser engravings made by other lasers. Furthermore, a reliable laser like the ytterbium fiber laser produces a particularly uniform structure of the recess structures, since its beam properties change comparatively little over the course of an engraving.

Alternatively, the recess structures can be laser engraved with a different laser or not laser engraved at all.

In a preferred embodiment of the invention according to all the alternatives already mentioned, the non-stick texture comprises local raised structures, wherein the raised structures are adjacent to the local recess structures, and wherein the raised structures have a height of 0.01 mm to 0.14 mm.

The local raised structures are local areas of the pressing surface within the non-stick texture. A raised structure contains one elevation. An elevation on the pressing surface can be identified, for example, by the fact that a closed curve of points of equal height, an isohypse, can be found on the pressing surface, which includes at least one point of locally maximum height, the respective summit point, on the pressing surface. The height of the elevation is, for example, the difference in height between the summit point or one of them and the lowest isohypse enclosing it (analogous to a notch height). The smallest area enclosed by such a lowest isohypse is then also the local area of the elevation. The elevations are therefore not just flat areas of the pressing surface between the recesses, but additional structures.

In particular, the local area of the raised structures has an extensive expansion that is less than ten times the extensive expansion of the recess structures. In particular, a local raised structure forms a raised wall around a recess structure of the non-stick texture. In particular, the raised structures are formed by the fact that, in the case of laser engraved recess structures, some of the material of the pressing surface that has been vaporized by the laser engraving has re-deposited next to the recesses on the pressing surface.

"Adjacent" means that the local area of a raised structure is located near a recess structure, in particular that at least one recess structure is at a distance from the local area of the raised structure that is less than the maximum distance between two points within the local area of the raised structure. Preferably, the local area of the raised structure contains a recess structure (since the raised structure surrounds the recess structure).

The raised structures contribute to the non-stick effect of the non-stick texture. The additional structuring of the pressing surface is even more effective at preventing powder material from adhering.

Alternatively, the non-stick texture may not have such raised structures, especially if the non-stick texture has recess structures that are not laser engraved.

Preferably, the local recess structures each have a maximum extensive expansion of 0.00002 $mm^2$ to 0.03 $mm^2$, in particular 0.0003 $mm^2$ to 0.008 $mm^2$, at half their depth. Half the depth refers to a height that is located at half the depth of the recess structure, e.g. according to the definition given at the beginning. The maximum extensive expansion is the area that is bounded by the local recess of the recess structure on the pressing surface at the corresponding height. Tests have shown that recess structures that exhibit such a maximum extensive expansion at half their depth are particularly well suited to preventing powder material from adhering, especially if the powder material is coffee powder. Furthermore, they can be easily produced using known laser engraving methods.

Alternatively, the recess structures can also have other extensive expansions, e.g. a larger extensive expansion.

However, this could lead to less efficient prevention of powder material from adhering.

Preferably, the local recesses are located on the pressing surface within a multiplicity of macro-areas, each with an extensive expansion of 0.3 $mm^2$ to 3.0 $mm^2$, wherein the macro-areas are separated from one another by boundary areas with a shallower depth than the depth of the local recess structures. A macro-area denotes a contiguous area of the pressing surface within which the recess structures are grouped. A multiplicity of macro-areas denotes a number of macro-areas that is at least 3, in particular at least 50, preferably at least 100. A macro-area is distinguished from other macro-areas by boundary areas that are located between the macro-areas. A boundary area is a contiguous area of the pressing surface within which there are no inventive recess structures and whose surface has at most only local recesses of shallower depth than the recess structures according to the invention. The pressing surface is particularly smooth and continuous within the boundary areas. In particular, the pressing surface may also have local recesses that have a shallower depth than the recess structures of the non-stick texture (in particular less than 50% of the average depth of the recess structures).

The boundary areas tend to have an extension that is smaller than that of the macro-areas, but larger than the areas of the local recesses of the recess structures and also larger (in particular at least by a factor of 5) than the mean distances of the recess structures within the macro-areas.

In particular, the distance between two recess structures is the shortest path (and its length) along the pressing surface that leads from a point on the pressing surface within a first recess structure and at half the depth of the first recess structure to a point on the pressing surface within a second recess structure and at half the depth of the second recess structure. If there are several such shortest paths, all these paths represent a distance between the two recess structures.

The assignment of recess structures to a macro-area can be carried out in particular as follows: If, in the multiplicity of recess structures, there is a subset (in particular more than three, preferably more than 10, particularly preferably more than 50) of recess structures on the pressing surface in which the mean distance of a recess structure to the nearest neighbor within the subset is lower by a certain factor (e.g. 5) than the smallest distance of a recess structure of the subset to the closest recess structure outside the subset, then this subset can be regarded as being arranged in a macro-area.

The area and shape of a macro-area then corresponds in particular to the largest area and (macroscopic) shape on the pressing surface that can be delimited by connected boundaries, each of which runs within a recess structure (below half its depth), or each of which corresponds to a distance between two recess structures within the macro-area.

Preferably, there is a substantially equal number of recess structures within each macro-area. Alternatively, this number may also vary.

Tests have shown that a non-stick texture in which the recess structures are located within a multiplicity of corresponding macro-areas effectively prevents powder material from adhering. Such a surface is particularly easy to produce, especially by laser engraving. The separate macro-areas can be created (also in groups of macro-areas) in individual processing steps of the laser engraving, e.g. with a corresponding laser incidence angle for each processing step. This makes it particularly easy to create the inventive non-stick texture. In addition, the arrangement of the recess structures in macro-areas allows a large area of the pressing surface to be covered with a comparatively small number of recess structures. This makes the inventive non-stick texture particularly robust and also particularly easy to produce.

Alternatively, the recess structures can also be arranged in larger macro-areas or, for example, only cover a contiguous area, i.e. without any further structuring.

In a preferred embodiment of the invention, the macro-areas of the non-stick texture have a hexagon shape and are arranged in the arrangement of a hexagon honeycomb pattern on the pressing surface. This means that the macro-areas each have locally essentially the shape of a hexagon, in particular a regular hexagon (ignoring the curvature of the pressing surface or the edge area of the non-stick texture), and that they are arranged in relation to each other in the form of a honeycomb pattern. This geometry has the advantage that the macro-areas have a simple shape, in particular without sharp angles. In particular, regular hexagons also offer a symmetry with respect to rotations of multiples of 60°. They therefore appear the same from different angles and are thus particularly easy to produce by laser engraving, especially in the case of a multiplicity of such shapes. This is because the laser requires only a small constant range of motion per macrostructure, even from different perspectives. One advantage of the honeycomb pattern, also known as a bee honeycomb pattern or a hexagonal parquet pattern, is the ideal parquetry. In this pattern, neighboring macro-areas always face each other across complete edges. A pattern like this is particularly easy and inexpensive to produce. In addition, tests have shown that a pattern like this is well suited for recess structures to prevent powder material from adhering.

Alternatively, the macro-areas can take on a multiplicity of other forms, e.g. a triangular form, a quadrangular form, in particular a square form, a pentagonal, heptagonal, octagonal or polygonal form. Equally, more complex forms are conceivable, which correspond, for example, to a silhouette or a design.

In a particularly preferred alternative of the invention, the macro-areas simulate or imitate the appearance of a material surface such as wood, leather, stone or a fabric, in particular a woven fabric. These structures on the pressing surface can also be realized as laser engravings. These alternatives have also been shown in experiments to effectively prevent powder material from adhering. In addition, such structures can also be easily realized as laser engravings and are often already producible in an established commercial process for laser engraving.

In a preferred alternative of the invention, the pressing surface is rotationally symmetrical about an axis of symmetry and the non-stick structure covers at least one area of the pressing surface that forms a normal angle of less than 20° with the axis of symmetry of the pressing surface.

In this case, rotationally symmetrical about an axis of symmetry means that an axis of symmetry exists, wherein the pressing surface (apart from the non-stick texture) can be mapped essentially onto itself (at least 70% agreement) by rotation about the axis of symmetry. This also includes discrete rotational symmetries, i.e. symmetries about fixed angles, such as 60°. An example of such a pressing surface is a spherical cap, where the line determining the height forms the axis of symmetry.

In this context, covering means that the surface of the non-stick structure (according to the definition given at the beginning) contains at least the area of the pressing surface with a normal angle of less than 20° to the axis of symmetry.

The normal angle is the smallest angle that can be formed between the local surface normal of the pressing surface and the axis of symmetry.

The area of the pressing surface with a normal angle of less than 20° to the axis of symmetry can include relatively smaller areas with a different normal angle to the axis of symmetry, or even no normal angle at all (e.g. a flank of a local elevation on the pressing surface).

Typically, molding tools for the production of rotationally symmetrical molded bodies have a similarly rotationally symmetrical shape. In this process, force is typically applied to the powder material along the axis of symmetry. In the case of concave pressing surfaces, in particular dome-shaped pressing surfaces, particularly high contact pressures can occur between the pressing surface and the powder material in the area of the pressing surface that is close to the axis of symmetry. Because the non-stick structure covers at least a portion of the pressing surface that makes a normal angle of less than 20° with the axis of symmetry of the pressing surface, the non-stick texture can take effect in the area where the greatest contact pressures occur. In particular, such an alignment of the non-stick texture allows the surface area of the non-stick texture to be limited, while still effectively preventing powder material from adhering. This results in inventive molding tool that is easy to manufacture.

Alternatively, the pressing surface may also be non-rotationally symmetrical, or shaped (e.g. conical) so that an area of the pressing surface with a normal angle of less than 20° to the axis of symmetry does not exist. Also, the non-stick texture can, for example, only cover partial areas of the pressing surface with a normal angle of less than 20° to the axis of symmetry.

In a preferred embodiment of the invention, there is an area extensively outside the non-stick texture on the pressing surface, the surface of which is essentially smooth relative to the non-stick texture.

In this case, extensively outside the non-stick texture means an essentially contiguous area of the pressing surface on which there are no inventive recess structures and which is not within the area of the non-stick texture, in particular according to the definition given at the beginning. Relative to the non-stick texture, smooth means that the area has no recesses or elevations that are in the same order of magnitude as the recess structures and raised structures of the non-stick texture, and in particular no deeper or higher recesses or elevations. In particular, this area may be a smoothly polished area of the pressing surface. Outside means in particular that the area is not enclosed by the non-stick texture, but is located between the non-stick texture and the outer edge of the pressing surface. In particular, the smooth area completely frames the non-stick texture, so the surface of the non-stick texture does not extend to the edge of the pressing surface.

The advantage of this type of molding tool is that the non-stick texture does not have to be created in the areas of the pressing surface that are located at the edge of the pressing surface.

This makes the inventive molding tool particularly easy to manufacture. Tests have shown that a smooth area outside the non-stick texture can be tolerated and that powder material is still effectively prevented from adhering. Because the smooth area does not need to be textured, the manufacturing of the molding tool is simplified.

In a preferred embodiment of the invention, the pressing surface is dome-shaped and an area of the non-stick texture corresponds to a first inner concentric region of the pressing surface, wherein an outer smooth second region of the pressing surface is located around the non-stick texture and wherein the first region makes up 10% to 60%, in particular 20% to 50%, of the pressing surface and the second region makes up the rest of the pressing surface.

A first inner concentric region here designates a subregion of the dome-shaped pressing surface, which is also dome-shaped, wherein the axis of symmetry of the dome-shaped pressing surface intersects the first region and wherein the first region is also symmetrical with respect to the axis of symmetry of the pressing surface. A region of the non-stick texture refers specifically to the surface of the non-stick texture as defined in the initial definition. The second smooth region is located around the first region, i.e. the second region is located between the first region and the edge of the pressing surface and makes up the rest of the pressing surface.

The advantage of this arrangement is that it is particularly efficient at preventing powder material from adhering to the molding tool, while at the same time making it easy to produce the non-stick texture. In particular, the non-stick texture can be easily laser engraved without the need for excessively large laser incidence angles, which in turn could negatively affect the non-stick properties of the recess structures. Furthermore, this arrangement prevents geometric difficulties from occurring during laser engraving, in which part of the molding tool shades or shields parts of the pressing surface from the laser. The arrangement thus allows for dome-shaped pressing surfaces with a steep edge, which effectively prevent powder material from adhering and are still easy to produce. This creates a molding tool that is particularly suitable for pressing powder material into round or approximately round molded bodies.

In a preferred embodiment of all the above variants of the invention, the local recess structures have on average a closest distance of 0.01 mm to 0.04 mm to one another.

The closest distance is thus the distance, e.g. according to the definition given at the beginning, of each recess structure to the recess structure lying closest to it. The averaged closest distance is thus the closest distance averaged over all recess structures of the multiplicity.

Such an arrangement of the recess structures can therefore also be easily implemented by grouping the non-stick texture into macro-areas according to the above description.

In tests, this arrangement has proven to be particularly effective in preventing powder material from adhering. At the same time, the non-stick structure can be easily laser-engraved and thus easily produced according to this arrangement.

Alternatively, the recess structures can also have a different arrangement on the pressing surface.

In a preferred embodiment of the invention, the molding tool consists essentially of high-speed steel, in particular of an alloy corresponding to the grade HS6-5-2-5.

High-speed steel, in particular an alloy corresponding to the grade HS6-5-2-5, is particularly well suited as a material for the inventive molding tool due to its stability, hardness, heat and wear resistance. In particular, the pressing surface is made of this material. It is exposed to high forces and must withstand many uses without the non-stick texture changing its shaping, which could cause it to lose its non-stick properties.

High-speed steel can easily be laser engraved, wherein it is not damaged by laser engraving (e.g. by the formation of cracks) and is therefore a particularly suitable basis for creating the non-stick texture.

Alternatively, the molding tool can be made of a different material, e.g. a different hardened steel, in particular stainless steel, aluminum, ceramic, plastic, in particular fiber-reinforced plastic, or wood. In particular, the pressing surface can also be made of a different material from the body of the molding tool and can, for example, be a coating.

The following detailed description and the entirety of the patent claims reveal further advantageous embodiments and feature combinations of the invention.

BRIEF DESCRIPTION OF THE DRAWINGS

The drawings used to explain the exemplary embodiment show.

In principle, the same reference symbols are used for the same parts in the figures.

WAYS TO IMPLEMENT THE INVENTION

FIG. 1 to FIG. 4 schematically show a molding tool 1 according to the invention for use in pressing operations for pressing coffee powder and various partial areas of the molding tool 1.

Figure 1:
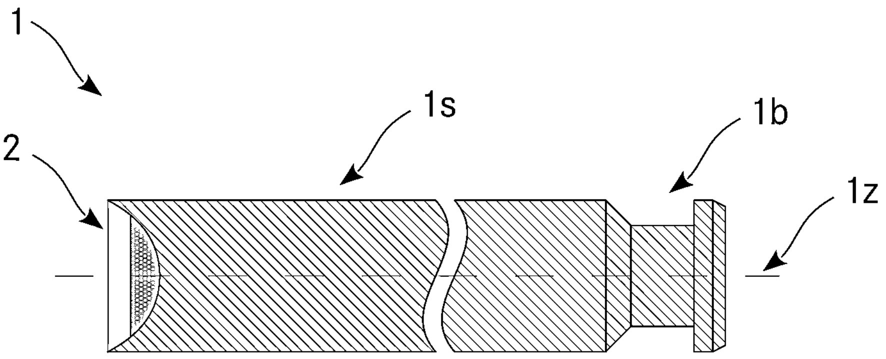
FIG. 1 a cross-section of a first molding tool according to the invention.

FIG. 1 shows the molding tool 1 according to the invention as a cross-section in a plane containing an axis of symmetry 1*z* of the cylindrically symmetrical molding tool 1. The molding tool 1 essentially consists of a cylindrical body, the shaft 1*s*, which is approximately six times longer (horizontally in the image plane of FIG. 1) than it is wide (vertically in the image plane of FIG. 1). The molding tool 1 is solid and made of hardened high-speed steel of the grade HS6-5-2-5. For ease of presentation, the molding tool 1 is shown in a shortened form in FIG. 1, wherein the molding tool 1, or its shaft 1*s*, is cylindrical between the curved interruption lines with an unchanged constant diameter.

At one end of the shaft 1*s*, there is a mounting area 1*b* with a smaller diameter than the shaft 1*s*, which allows the molding tool 1 to interact with an axial drive component (not shown), for example. At the other end of the shaft 1*s*, there is a dome-shaped pressing surface 2, which is formed by an indentation at the shaft end. The pressing surface 2 is also (apart from the non-stick texture 3, see FIG. 3 and FIG. 4) symmetrical to the axis of symmetry 1*z* of the molding tool 1. Its lowest point, relative to the shaft 1*s*, is thus located on the axis of symmetry 1*z* and its depth decreases uniformly in all directions. The pressing surface 2 is designed to come into contact with the coffee powder to be pressed during pressing operations.

Two identically constructed molding tools 1 can, for example, interact with a stationary part whose inner geometry corresponds to a spherical layer in order to jointly produce spherical compacts.

Figure 2A:
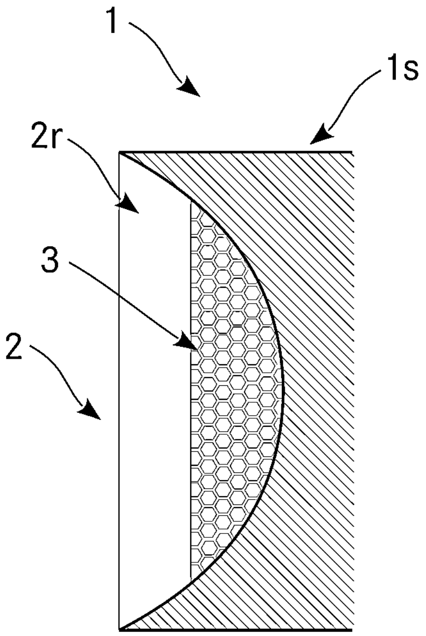
FIG. 2*a* an enlarged view of the pressing surface of the first molding tool.

The area of pressing surface 2 is shown enlarged in FIG. 2*a* in the same view as in FIG. 1. The pressing surface 2 extends over the entire width of the molding tool 1 and thus forms the entire end of the shaft 1*s*. The pressing surface 2 is completely concave with a variable curvature, wherein the radii of curvature are in the range of approximately 45% to 55% of the width of the molding tool. Thus, the pressing surface 2 forms an arched shape at the sectional plane, which extends over the entire width of the molding tool 1. The radius of curvature of the bulge of pressing surface 2 is about 20% greater at the edge than in the central area of pressing surface 2. The areas of pressing surface 2 that lie behind the sectional cutting plane are also shown schematically in FIG. 2*a*.

Figure 2B:
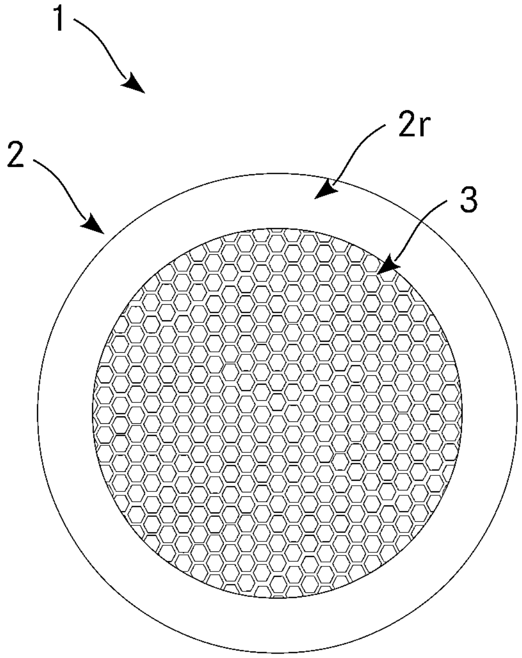
FIG. 2*b* a direct view of the pressing surface of the first molding tool.

FIG. 2*b* shows the molding tool 1 as a direct view onto the pressing surface 2. The pressing surface 2 is divided into two subregions, the smooth region 2*r* in the edge region and the non-stick texture 3 in the central region of the pressing surface 2. Both regions are rotationally symmetric with respect to the axis of symmetry 1*z* of the molding tool 1 (FIG. 1). The non-stick texture 3 makes up about 35% of the total pressing surface 2 (this proportion appears larger when viewed directly from above), while the smooth region 2*r* makes up the remaining part of the total pressing surface 2. In the smooth region 2*r*, the pressing surface 2 corresponds to a polished metal surface of the material of the molded body (high-speed steel of the type HS6-5-2-5) without any further texture.

Figure 3:
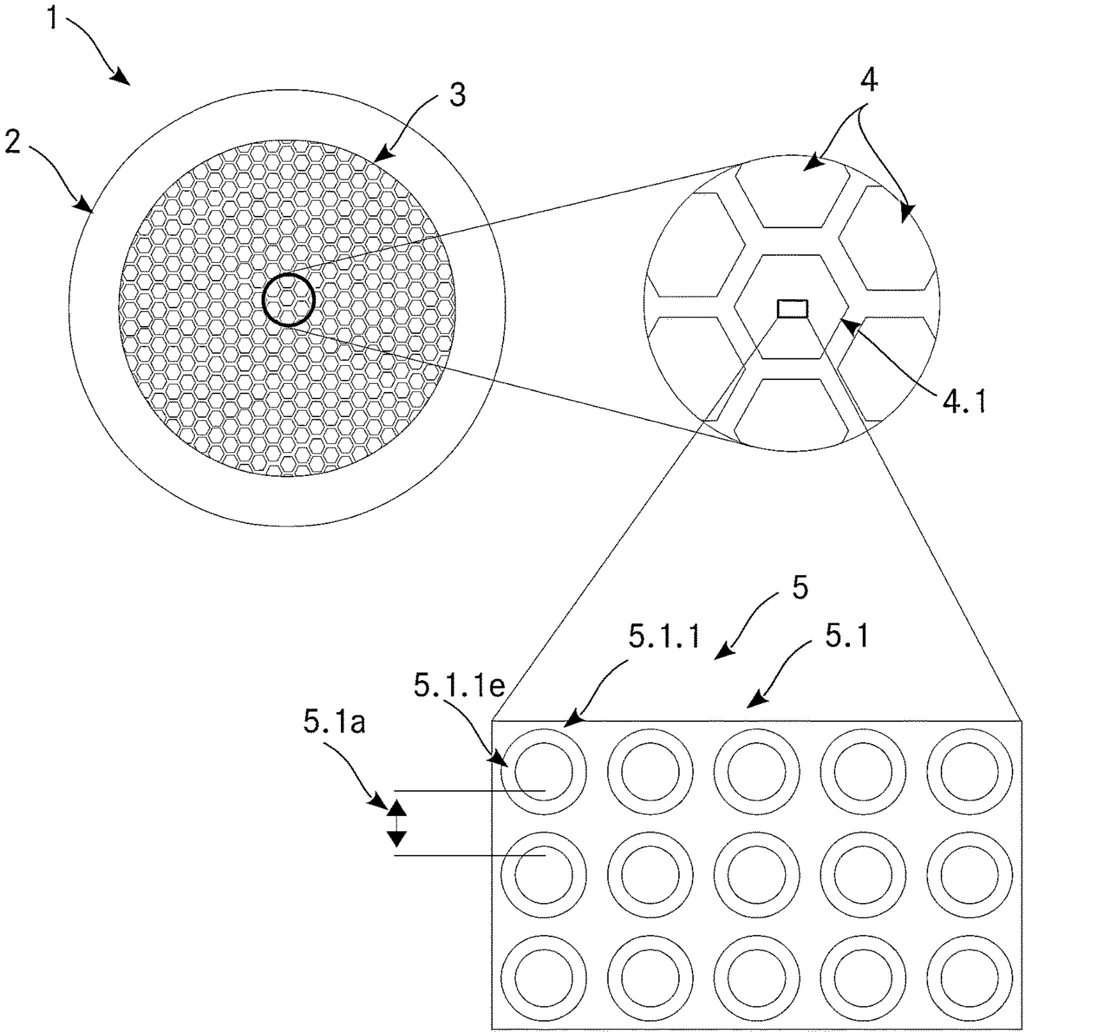
FIG. 3 a schematic representation of the structure of the non-stick texture.

FIG. 3 schematically shows the structure of the non-stick texture 3 of the pressing surface 2 of the molding tool 1, wherein the molding tool 1, or the pressing surface 3, is shown in the upper left region analogous to FIG. 2*b*. In a first enlargement, indicated by two connected rings, the structuring of the non-stick texture 3 is illustrated. The non-stick texture 3 is formed by a multiplicity 4 of macro-areas. The macro-areas of the multiplicity 4 have the shape of regular hexagons (except at the round outer edge of the non-stick texture 3, where they are cut off) and are arranged in a hexagon honeycomb pattern. The macro-areas of the multiplicity 4 are uniform and of the same type, except for the edge area and the deformation caused by the curvature of the pressing surface. All macro-areas (except for the truncated areas at the edge) each have an area of approximately 1 $mm^2$ and each consist of a subset (e.g. subset 5.1 in FIG. 3) of a multiplicity 5 of recess structures, each with adjacent raised structures. Between different macro-areas are regions on which there are no recess structures according to the invention. In these regions, the pressing surface 2 corresponds largely to the smooth region 2*r* outside the non-stick texture.

Another schematically drawn enlargement by two connected rectangles in FIG. 3 shows, for example, the composition of macro-area 4.1 (and thus of all macro-areas of multiplicity 4) by a subset 5.1 of multiplicity 5 of recess structures, each with adjacent raised structures. For example, the recess structure 5.1.1 is surrounded by the adjacent raised structure 5.1.1*e* (see FIG. 4 and description below). The recess structures of the subset 5.1 are arranged in a regular lattice-like manner within the macro-area 4.1 and cover the entire surface of the macro-area 4.1 on the pressing surface 2. All distances between two nearest neighboring recess structures within the multiplicity of 4 macro-areas, and thus also distance 5.1*a* within macro-area 4.1, are 0.02 mm. The distance 5.1*a* corresponds to the shortest distance along the pressing surface 3 from half the depth of a recess structure (in this case recess structure 5.1.1) to the next adjacent recess structure.

The multiplicity 5 of recess structures of the non-stick texture 3 is laser engraved. The recess structures are created in a laser engraving process in which the surface to be engraved is irradiated with laser pulses from an ytterbium fiber laser at a laser incidence angle of less than 20°. The focus diameter of the ytterbium fiber laser used to laser engrave the recess structures is 0.05 mm and its depth of focus is approximately 1 mm. Each recess structure of multiplicity 5 is laser engraved with 30 individual ablations of 0.0004 mm each. The extensive expansion of each recess structure of multiplicity 5 is in the region of 0.0003 $mm^2$ to 0.008 $mm^2$. The raised structures have a height of 0.01 mm to 0.14 mm.

Figure 4:
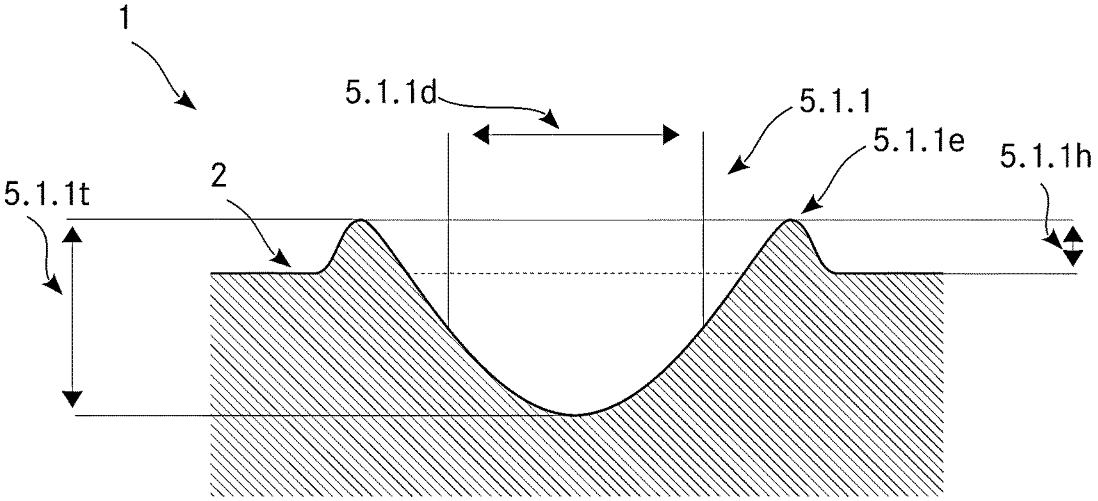
FIG. 4 a schematic cross-section of a recess structure.

FIG. 4 shows an example of the recess structure 5.1.1 on the pressing surface 2 of the molding tool 1 as a schematic cross-section, wherein the sectional plane contains the local surface normal of the pressing surface 2 at the location of the lowest point of the recess structure 5.1.1. The recess structures of the multiplicity 5 are not exactly uniform and the remaining recess structures differ in detail from the shape shown.

The recess structure 5.1.1 is a depression on the pressing surface 2 that is rotationally symmetrical to the local surface normal of the pressing surface 2, with a depth 5.1.1*t* of 0.012 mm. The recess in the surface of the pressing surface is created through material removal by the applied laser pulses.

The recess structure 5.1.1 has a maximum extensive expansion of 0.002 $mm^2$ at half its depth 5.1.1*t* and a diameter of 0.05 mm at its half depth 5.1.1*t*.

The upper edge of the recess structure 5.1.1 also forms the upper edge of a raised structure 5.1.1*e*, which surrounds the recess structure 5.1.1 in a ring shape. The raised structure 5.1.1*e* has a height 5.1*h* of 0.003 mm. The raised structure 5.1.1*e* is formed by a partial deposition of the material removed during the laser engraving of the recess structure 5.1.1.

The non-stick texture 3 of the molding tool 1 of such a condition effectively prevents coffee powders of different types from adhering to the pressing surface 2 of the molding tool 1, even during pressing operations involving comparatively high pressures.

FIG. 5*a* to FIG. 5*f* show various alternative embodiments of the inventive molding tool 100, . . . , 600 for pressing coffee powder, which differ in the structuring of the respective non-stick texture 103, . . . , 603. FIG. 5*a* to FIG. 5*f* show the respective molding tool 100, . . . , 600 in a direct view onto its pressing surface 102, . . . , 602, analogous to FIG. 2*b*. The nature of the molding tools 100, . . . , 600 from FIG. 5*a* to FIG. 5*f* corresponds to the nature (except for the respective non-stick texture 103, . . . , 603) of the molding tool 1 from FIG. 1 to FIG. 4. The non-stick textures 103, . . . , 603 of the designs in FIG. 5*a* to FIG. 5*f* correspond in their extent to the non-stick texture 3 of the molding tool 1 from FIG. 1 to FIG. 4 and consist of a multiplicity of recess structures, which (except for the number of recess structures) correspond to the multiplicity 5 of recess structures of the molding tool 1. The black areas of the respective non-stick texture 103, . . . , 603 shown in FIG. 5*a* to FIG. 5*f* correspond to macro-areas composed of recess structures, within which the respective closest distances between two recess structures are 0.02 mm. The white regions of the non-stick textures 103, . . . , 603 correspond to regions of the respective pressing surface 102, . . . , 602, within which there are no inventive recess structures. The non-stick textures 103, . . . , 603 also effectively prevent coffee powder from adhering during pressing operations.

Figure 5A:
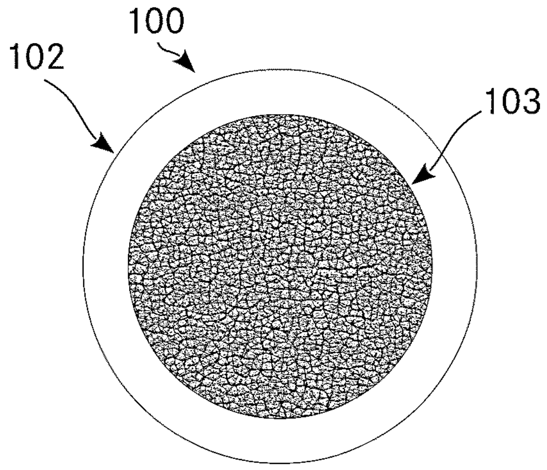
FIG. 5*a-f* various other molding tools according to the invention as a direct view onto their respective pressing surface, wherein these have different structurings of the non-stick texture.

FIG. 5*a* shows a molding tool 100 with a pressing surface 102 on which a non-stick texture 103 is located. The multiplicity of recess structures of the non-stick texture 103 is distributed on the pressing surface 102 in such a way that the non-stick texture imitates the appearance of a (finely structured) leather surface.

Figure 5B:
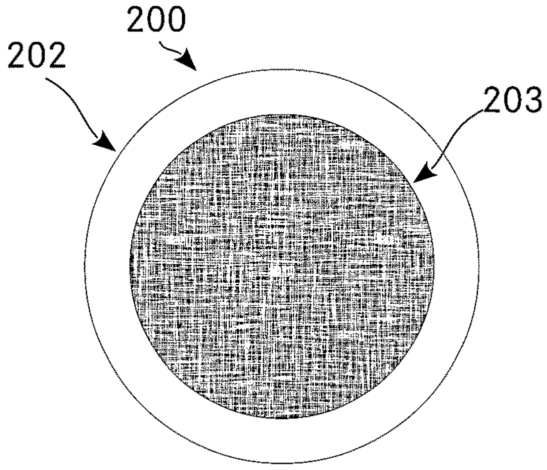

FIG. 5*b* shows a molding tool 200 with a pressing surface 202 on which a non-stick texture 203 is located. Here, the multiplicity of recess structures of the non-stick texture 203 is distributed over the pressing surface 202 in such a way that the non-stick texture 203 imitates the appearance of a (finely structured) fabric surface, e.g. linen.

Figure 5C:
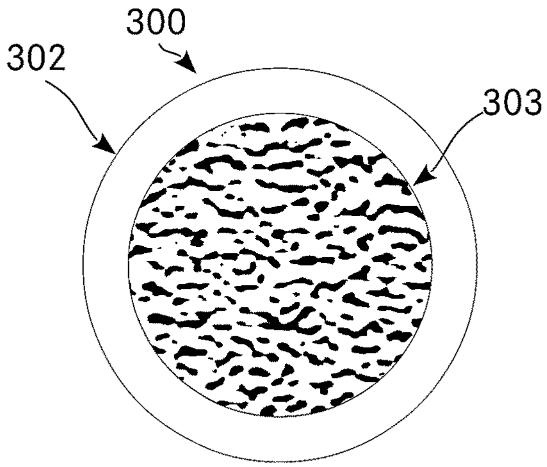

FIG. 5*c* shows a molding tool 300 with a pressing surface 302 on which a non-stick texture 303 is located. The multiplicity of recess structures of the non-stick texture 303 is distributed on the pressing surface 302 in such a way that the non-stick texture reproduces a wave pattern on the pressing surface 302. The wave-shaped macro-areas have an area of 0.1 to 2 $mm^2$.

Figure 5D:
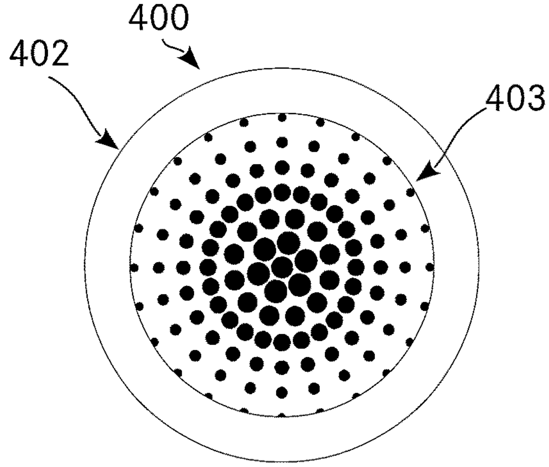

FIG. 5*d* shows a molding tool 400 with a pressing surface 402 on which a non-stick texture 403 is located. The multiplicity of recess structures of the non-stick texture 403 is distributed on the pressing surface 402 in a dot pattern in which larger dots (with an area of approximately 10 mm2) are located near the center of the pressing surface 402 and the diameter of the dots decreases towards the edge of the non-stick texture 403.

Figure 5E:
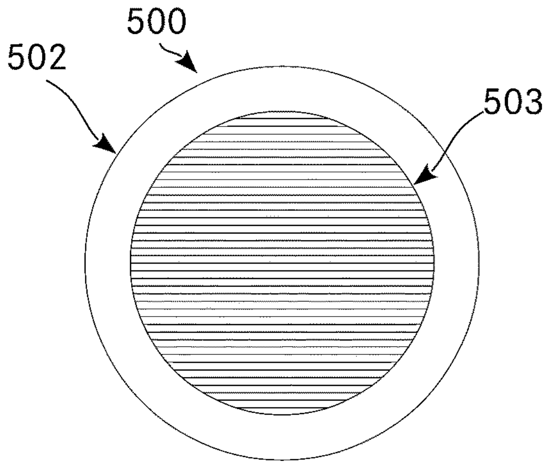

FIG. 5*e* shows a molding tool 500 with a pressing surface 502 on which a non-stick texture 503 is located. The multiplicity of recess structures of the non-stick texture 503 is arranged in parallel lines that are evenly spaced apart and that run completely through the non-stick texture 503. In terms of width, each line (of approx. 0.1 mm) also encompasses several recess structures located next to one another. The distance between the individual lines is 0.5 mm.

Figure 5F:
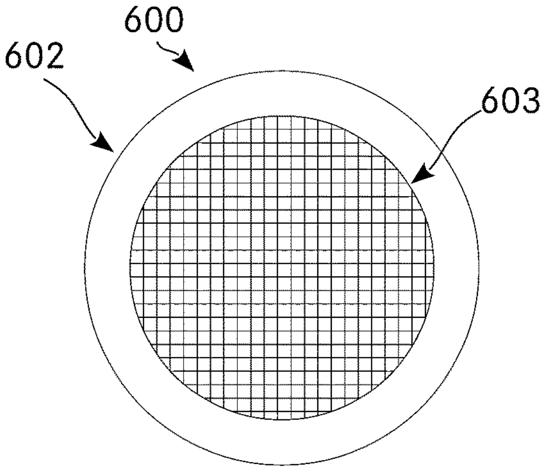

FIG. 5*f* shows a molding tool 600 with a pressing surface 602 on which a non-stick texture 603 is located. The multiplicity of recess structures of the non-stick texture 603 is arranged in regularly spaced grid lines, which form a regular and uniform grid pattern. Two parallel adjacent grid lines are approximately 1 mm apart. Within each grid line, there are also several adjacent recess structures across the width of the grid line (approx. 0.1 mm).

The invention is not limited to the exemplary embodiments set forth above. For example, the molding tool may have a different shape, for example with a longer or shorter shaft, or a shaft with further regions in which its diameter varies. Also, the molding tool may have a more complex geometry, for example for cases in which it is not intended to move the molding tool and it interacts, for example, with a moving pressing tappet. In addition, the molding tool can be made of a different material, such as 304L stainless steel. Furthermore, the pressing surface can be made of a different material than the rest of the molding tool, for example, by means of a coating.

The pressing surface need not be rotationally symmetrical, but can have an oval or square profile. The pressing surface can also have a more complex shape that presses designs or lettering into a molded body. The molding tool as a whole does not necessarily have to be rotationally symmetrical either. The extent of the non-stick texture may be smaller or larger than in the exemplary embodiments shown and its edge may have a shape other than a round one. For example, the non-stick texture may also be rectangular or star-shaped. The recess structures may also not be laser engraved, but may be pressed in, for example, or laser engraved with a different type of laser. The recess structures can also be laser engraved with more or fewer individual ablations. The closest distance between the recess structures can be greater or smaller. The recess structures can also have a depth other than 0.012 mm or have a different maximum dimension. Furthermore, the non-stick texture, especially in the case of non laser engraved recess structures, may also have no elevations or elevations that are not arranged around the recess structures. Furthermore, the shown shape of the recess structure is purely exemplary and may differ from the example (even within a molded body).

The structuring of the non-stick texture shown, e.g. as hexagonal macro-areas, is just one possible design. There are countless other patterns or structures that could be used, for example, uniformly dotted patterns, uniform filling of the entire non-stick texture with recess structures, a random arrangement of the recess structures (e.g. according to a Monte Carlo method), tiling with square or rectangular macro-areas, a wood look imitation and many more. The molding tool can also be designed for other powder materials than coffee powder or can be used in the form shown for other powder materials than coffee powder.

In summary, it can be stated that an extensive non-stick texture with a multiplicity of local recess structures, wherein the recess structures each have a depth of 0.04 mm to 0.2 mm, in particular a depth of 0.08 mm to 0.14 mm, creates a molding tool that effectively prevents powder material from adhering during pressing operations.

The invention claimed is:

1. A molding tool for use in pressing operations for pressing powder material, comprising;

a concave pressing surface, wherein an extensive non-stick texture is located on the pressing surface to prevent powder material from adhering, wherein the non-stick texture comprises a multiplicity of local recess structures, wherein the recess structures each have a depth of 0.04 mm to 0.2 mm, and wherein the local recess structures are laser engraved at a laser incidence angle of at most 40°.

2. The molding tool according to claim 1, wherein the local recess structures each have a maximum extensive expansion of 0.00002 $mm^2$ to 0.03 $mm^2$ at half their depth.

3. The molding tool according to claim 1, wherein the local recesses are located within a multiplicity of macro-areas, each macro-area having an extensive expansion of 0.3 $mm^2$ to 3.0 $mm^2$ on the pressing surface, wherein the macro-areas are separated from one another by boundary areas having shallower depths than the depth of the local recess structures.

4. The molding tool according to claim 3, wherein the macro-areas of the non-stick texture have a hexagon shape and are arranged on the pressing surface in a hexagon honeycomb pattern.

5. The molding tool according to claim 1, wherein the local recess structures have on average a closest distance of 0.01 mm to 0.04 mm to one another.

6. The molding tool according to claim 1, consisting essentially of high-speed steel.

7. The molding tool according to claim 1, wherein the recess structures each have a depth of 0.08 mm to 0.14 mm.

8. The molding tool according to claim 2, wherein the local recess structures each have a maximum extensive expansion of 0.0003 $mm^2$ to 0.008 $mm^2$ at half their depth.

9. A molding tool for use in pressing operations for pressing powder material, comprising;

a concave pressing surface, wherein an extensive non-stick texture is located on the pressing surface to prevent powder material from adhering, wherein the non-stick texture comprises a multiplicity of local recess structures, wherein the recess structures each have a depth of 0.04 mm to 0.2 mm, and wherein the pressing surface is rotationally symmetrical with respect to an axis of symmetry and the non-stick structure covers at least one region of the pressing surface which forms a normal angle of less than 20° with respect to the axis of symmetry of the pressing surface.

10. The molding tool according to claim 9, wherein the recess structures are each laser engraved through a plurality of individual ablations, wherein an individual ablation in each case produces a local recess with a depth of 0.0002 mm to 0.0006 mm.

11. The molding tool according to claim 10, wherein the recess structures are each laser engraved through at least 10 and at most 50 individual ablations.

12. The molding tool according to claim 9, wherein the recess structures are laser engraved by a laser with a focus diameter of 0.005 mm to 0.2 mm.

13. The molding tool according to claim 9, wherein the recess structures are laser engraved by an ytterbium fiber laser.

14. The molding tool according to claim 13, wherein the non-stick texture comprises local raised structures, the raised structures being adjacent to the local recess structures, and the raised structures having a height of 0.01 mm to 0.14 mm.

15. The molding tool according to claim 12, wherein the recess structures are laser engraved by a laser with a focus diameter of 0.02 mm to 0.1 mm.

16. A molding tool for use in pressing operations for pressing powder material, comprising;

a concave pressing surface, wherein an extensive non-stick texture is located on the pressing surface to prevent powder material from adhering, wherein the non-stick texture comprises a multiplicity of local recess structures, wherein the recess structures each have a depth of 0.04 mm to 0.2, wherein there is an area extensively outside the non-stick texture on the pressing surface, the surface of which is essentially smooth relative to the non-stick texture, and wherein the pressing surface is dome-shaped and an area of the non-stick texture corresponds to a first inner concentric region of the pressing surface, wherein an outer smooth second region of the pressing surface is located around the non-stick texture and wherein the first region makes up 10% to 60% of the pressing surface and the second region makes up the rest of the pressing surface.

17. The molding tool according to claim 16, wherein the first region makes up 20% to 50% of the pressing surface.

* * * * *